United States Patent
Takiguchi et al.

(10) Patent No.: US 7,174,032 B2
(45) Date of Patent: Feb. 6, 2007

(54) APPARATUS, METHOD, AND PROGRAM FOR PERSONAL IDENTIFICATION

(75) Inventors: Kiyoaki Takiguchi, Kanagawa (JP); Masashi Ohkubo, Kanagawa (JP); Takaaki Nakamura, Tokyo (JP); Kazuhiko Aida, Tokyo (JP)

(73) Assignee: Sony Corporation (JP)

( * ) Notice: Subject to any disclaimer, the term of this patent is extended or adjusted under 35 U.S.C. 154(b) by 790 days.

(21) Appl. No.: 10/284,314

(22) Filed: Oct. 31, 2002

(65) Prior Publication Data

US 2003/0086592 A1 May 8, 2003

(30) Foreign Application Priority Data

Nov. 8, 2001 (JP) ............................ P2001-343605

(51) Int. Cl.
*G06K 9/00* (2006.01)
(52) U.S. Cl. ........................ 382/115; 382/274; 235/280
(58) Field of Classification Search ................. 382/107, 382/108, 115, 116, 140, 168, 203, 209, 219, 382/274, 305, 321, 259; 368/127; 340/573.4; 356/71; 235/380; 704/246
See application file for complete search history.

(56) References Cited

U.S. PATENT DOCUMENTS

| | | | | |
|---|---|---|---|---|
| 4,122,662 A | * | 10/1978 | Visconti | ..................... 368/127 |
| 4,699,149 A | * | 10/1987 | Rice | ........................... 600/475 |
| 5,745,037 A | * | 4/1998 | Guthrie et al. | ........... 340/573.4 |
| 6,179,444 B1 | * | 1/2001 | Plesko | ........................ 362/259 |
| 6,912,045 B2 | * | 6/2005 | Kono et al. | ................... 356/71 |
| 6,920,236 B2 | * | 7/2005 | Prokoski | ..................... 382/115 |
| 6,993,160 B2 | * | 1/2006 | Miura et al. | ................ 382/115 |

* cited by examiner

*Primary Examiner*—Matthew C. Bella
*Assistant Examiner*—Seyed Azarian
(74) *Attorney, Agent, or Firm*—Rader, Fishman & Grauer, PLLC; Ronald P. Kananen

(57) ABSTRACT

An apparatus and a method for personal identification include an image pickup section for picking up an image of a blood vessel pattern of a wrist, a storage unit for storing in advance an image of a blood vessel pattern of a certain person as a registered image, and a control section (CPU) for the computation of degrees of similarity according to data differences between the image of the blood vessel pattern picked up by the image pickup section and the registered image to determine identification according to the relationship between the computed degrees of similarity and a threshold, thereby eliminating the need to carry out processing by a characteristic extraction section or the like.

12 Claims, 6 Drawing Sheets

APPARATUS, METHOD, AND PROGRAM FOR PERSONAL IDENTIFICATION

BACKGROUND OF THE INVENTION

1. Field of the Invention

The present invention relates to an apparatus and a method for personal identification, and, particularly relates to an apparatus and a method for personal identification in which images of blood vessel patterns of human bodies are used.

2. Description of the Related Art

As is widely known, research on the use of physical characteristics of users (biometrics) for information unique to each user to be used in personal identification has been carried out in recent years. Although fingerprints are most widely used in biometrics, identification also is performed using retinas, irises, voiceprints (voices), palm prints, faces, or the like.

In such identification methods, however, characteristics are typically extracted from information on human bodies obtained by image pickup, voice recording, or the like, to be converted into patterns, which will be compared with previously stored patterns to determine if they are identical or not. Accordingly, conversion into precise patterns is needed to ensure identification accuracy, and it takes some time to perform a pattern recognition process in practical identification, which does not permit quick personal identification.

SUMMARY OF THE INVENTION

Based on the above described technical problem, it is a primary object of the present invention to provide an apparatus and the like for personal identification, which make it possible to achieve personal identification with high accuracy by a simple process.

For this purpose, the inventors of the present invention took into account the fact that patterns of veins at the wrists of human bodies (blue-looking blood vessel patterns seen through skins) are different between the right and left hands of even a single human body or also between twins, thus the patterns of veins at the wrists of human bodies can be used as identifying information to enable accurate identification. In addition, blood vessel patterns of veins and the like are coarse compared to those of fingerprints and irises, thus making it possible to detect the patterns with much lower resolutions. Consequently, the following means was employed.

An apparatus for personal identification according to the invention is comprised of a storage unit for storing an image of the blood vessel pattern of a certain person as a registered image, an image pickup section for picking up an image of the blood vessel pattern of a human body, and an identification section for computing the degrees of similarity according to the data differences between the image of the blood vessel pattern picked up by the image pickup section and the registered image to determine identification, according to the relationship between the degrees of similarity and a predetermined threshold.

Adoption of such comparison of two images of blood vessel image patterns, in order to make a comparison of images with a coarse resolution, does not require a heavy processing load in comparing images. Furthermore, the degree of similarity is computed using the difference between the two images herein, and then this degree of similarity is compared with a threshold to determine whether the images are identical or not, which requires no processing, such as extracting characteristics in pattern recognition.

In this process, it is desirable that the relative position between the image of the blood vessel pattern and the registered image is changed within a predetermined range, and the degrees of similarity are obtained for the plurality of the respective relative positions to be compared with the predetermined threshold by the identification section, and thus identification is determined. Accordingly, the registered image can be handled even when there is a position deviation from the picked-up image of the blood vessel pattern.

Further, if the identification section is designed such that it stops computing degrees of similarity when identity is permitted by the degree of similarity computed for one of the plurality of relative positions, computation thereafter can be omitted.

In addition, the apparatus for personal identification may be further provided with a positioning section on which a wrist is positioned and a recessed section formed on the top surface of the positioning section in a recessed shape, wherein the image pickup section may be located on the bottom surface of the recessed section. With this configuration, the wrist and a data detection surface are separated from each other, which prevents the wrist from being pressed against the data detection surface to keep an image thereof from enlarging.

Still further, it also can be understood that the present invention includes an invention of a method for personal identification. The method for personal identification according to the invention is comprised of the steps of: storing in advance, as a registered image, an image formed by extracting spatial frequency components within a predetermined range from an image of the blood vessel pattern of a certain person; picking up an image of the blood vessel pattern of a person to be identified; and forming an identification image by extracting spatial frequency components within the predetermined range from the picked up image of the blood vessel pattern to determine whether the person to be identified and the certain person are the same, according to the degree of similarity between the identification image and the registered image.

Thus, extraction of spatial frequency components within a specified range permits images of patterns with a certain scale, that is to say enhanced images of blood vessel patterns.

The extraction of spatial frequency components within the specified range herein can be easily carried out by subtracting the tone data of an image of the blood vessel pattern smoothed at a second scale from the tone data of an image of the blood vessel pattern smoothed at a first scale, wherein the second scale is greater than the first scale. Herein, data indicating luminance or color tone can be employed as tone data.

If the luminances of registered images and those of identification images are adjusted to be within a specific range, it is easier to determine correctly the degree of similarity.

It also can be understood that the present invention includes an invention of a program. A program according to the invention enables a computer to determine the identity of two images representing physical characteristics of a human body, wherein the program operates the computer so that the computer functions as a first means for computing the degree of similarity of the two images with the sum of data differences between corresponding pixels which respectively compose the two images and as a second means for determining whether the two images are the same by comparing the degree of similarity with a threshold.

In this program, it is desirable that the first means designates, as corresponding pixels, predetermined pixels composing one image and other pixels composing the other image, wherein these other pixels are within a predetermined region from the respective predetermined pixels and make minimum data differences therefrom.

In other words, although in sampling image data, an image representing characteristics of a human body may deform or rotationally deviate some, it is possible to locally correct a small deformation and a deviation by selecting, as pixels corresponding to the predetermined pixels, other pixels within a predetermined region from these respective predetermined pixels.

Further in this program, if the first means has the function of changing the relative position between the two images to compute the degree of similarity for each relative position, the first means can correct the deviation of the overall images.

BRIEF DESCRIPTION OF THE DRAWINGS

FIGS. 5A to 5D are diagrams depicting details of image smoothing; wherein FIG. 5A is a graph conceptually representing the relationship between the frequency (horizontal axis) and the power spectrum (vertical axis) of an original image; FIG. 5B is a graph conceptually representing the relationship between the frequency (horizontal axis) and the power spectrum (vertical axis) of a weakly smoothed image; FIG. 5C is a graph conceptually representing the relationship between the frequency (horizontal axis) and the power spectrum (vertical axis) of a strongly smoothed image; and FIG. 5D is a graph conceptually representing the relationship between the frequency (horizontal axis) and the power spectrum (vertical axis) of an image formed by subtracting the image data of FIG. 5C from the image data of FIG. 5B.

DESCRIPTION OF THE PREFERRED EMBODIMENT

The present invention will now be described in detail according to an embodiment shown in the attached drawings.

Figure 1:
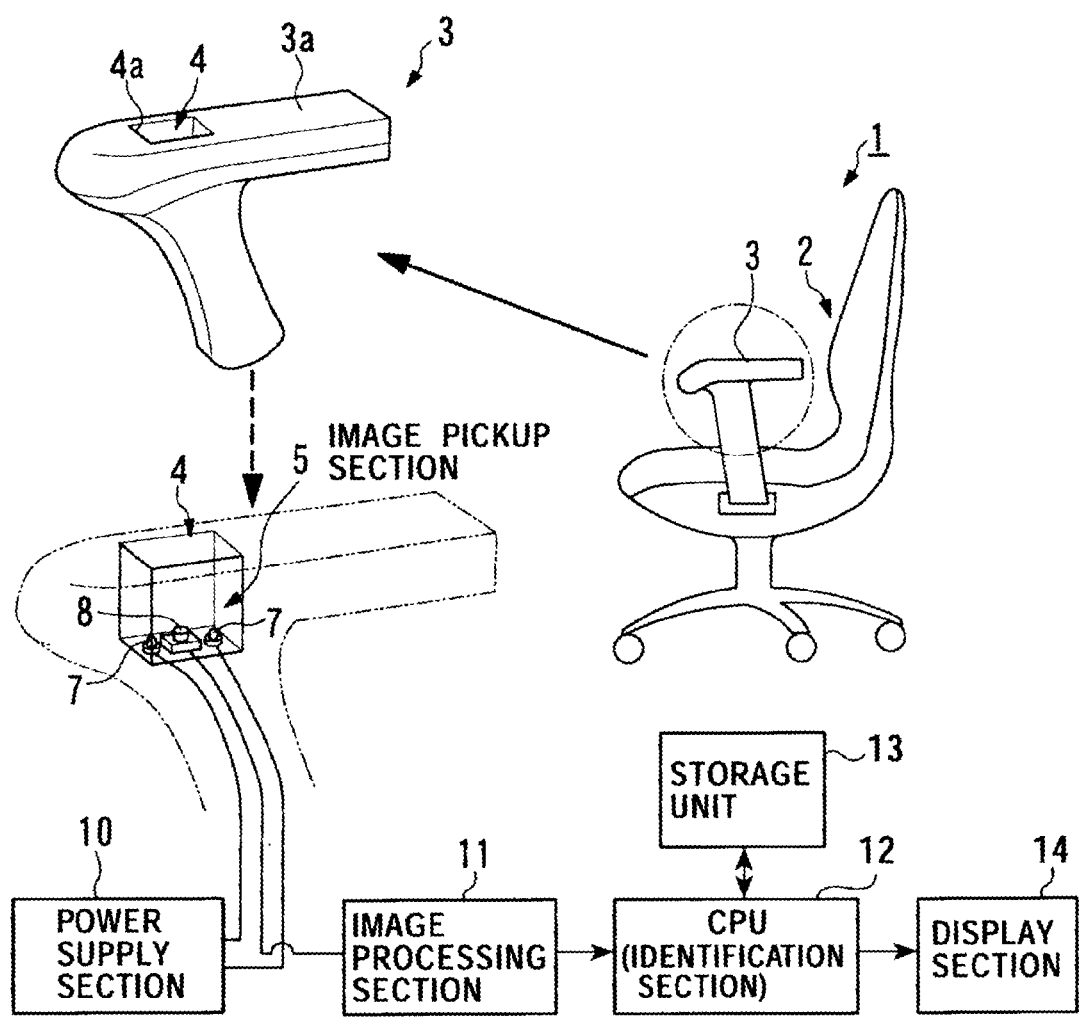
FIG. 1 is a schematic diagram showing the overall structure of an apparatus for personal identification according to the present invention.

FIG. 1 schematically shows an embodiment of the present invention, wherein reference numeral 1 denotes an apparatus for personal identification. As shown in FIG. 1, the apparatus 1 for personal identification is comprised of a chair section 2 on which a person can sit, an arm section (a positioning section) 3 on which a person to be identified who sits on the chair section 2 can position his or her arm, and an image pickup section 5 provided in a recessed section 4 formed in the front part of a top surface 3a of the arm section 3, wherein personal identification of the person to be identified can be carried out using a blood vessel pattern of the wrist of the person to be identified who is sitting on the chair section 2.

The image pickup section 5 is provided with a near-IR LED (Light Emitting Diode) 7 and an IR camera 8. The near-IR LED 7 emits near-IR light with a current supplied by a power supply section 10 that is shown in the figure. The IR camera 8 picks up an image of the wrist when the wrist, just below the palm of the human body, is positioned downward over an opening 4a of the recessed section 4 located on the top surface 3a of the arm section 3. Specifically, herein, the near-IR light emitted by the near-IR LED 7 illuminates a vein pattern of the wrist to pick-up an image thereof.

The IR camera 8 herein is a CCD camera capable of picking up RGB images.

Further, an image processing section 11 and a CPU (identification section) 12 are connected to the IR camera 8, wherein the CPU 12 also is connected to a storage unit 13 and a display section 14 for displaying of the identification result of the person sitting on the chair section 2. An image signal output by the IR camera 8 is converted into a luminance signal in the image processing section 11 for comparison by the CPU 12 with a registered image previously registered in the storage unit 13 in a manner to be described later. Thus, it is determined whether or not the person to be identified is the same as a certain person previously registered. When identification processing is completed, the CPU 12 displays the identification result on the display section 14.

The processing by the CPU 12 is performed using a program that is stored in the storage unit 13 and loaded into a program area in a RAM (not shown).

Figure 2:
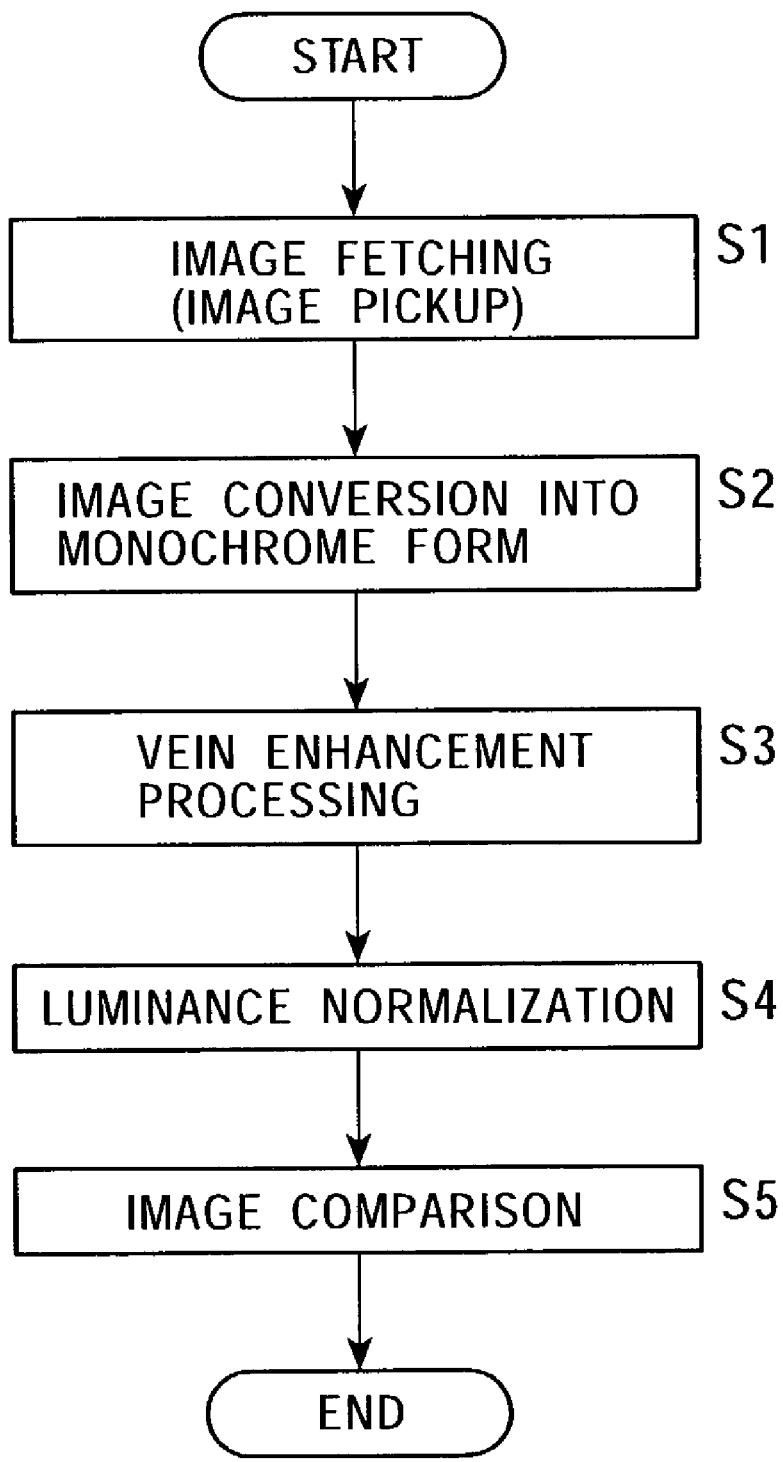
FIG. 2 is a diagram showing a procedure of a method for personal identification according to the invention, which is a flowchart of a process performed by a CPU.

Next, a method of identification using the apparatus for personal identification 1 will be described with reference to the flowchart in FIG. 2.

First of all, the person to be identified sits on the chair section 2 of the apparatus for personal identification 1 and puts his or her arm on the top surface 3a of the arm section 3 such that the wrist is positioned at the opening 4a of the recessing section 4. At this moment, near-IR light emitted by the near-IR LED 7 illuminates the vein pattern of the wrist facing the opening 4a so that the IR camera 8 picks up an image thereof (step S1).

The image data picked up by the IR camera 8 is output to the image processing section 11. Since the image data picked up by the IR camera 8 herein is a RGB image, the image processing section 11 first converts the image into a monochrome image (step S2), using data for necessary components (R and G components herein) out of the image data. Accordingly, the image data is represented as a plane distribution of luminance signals (tone data).

Figure 3:
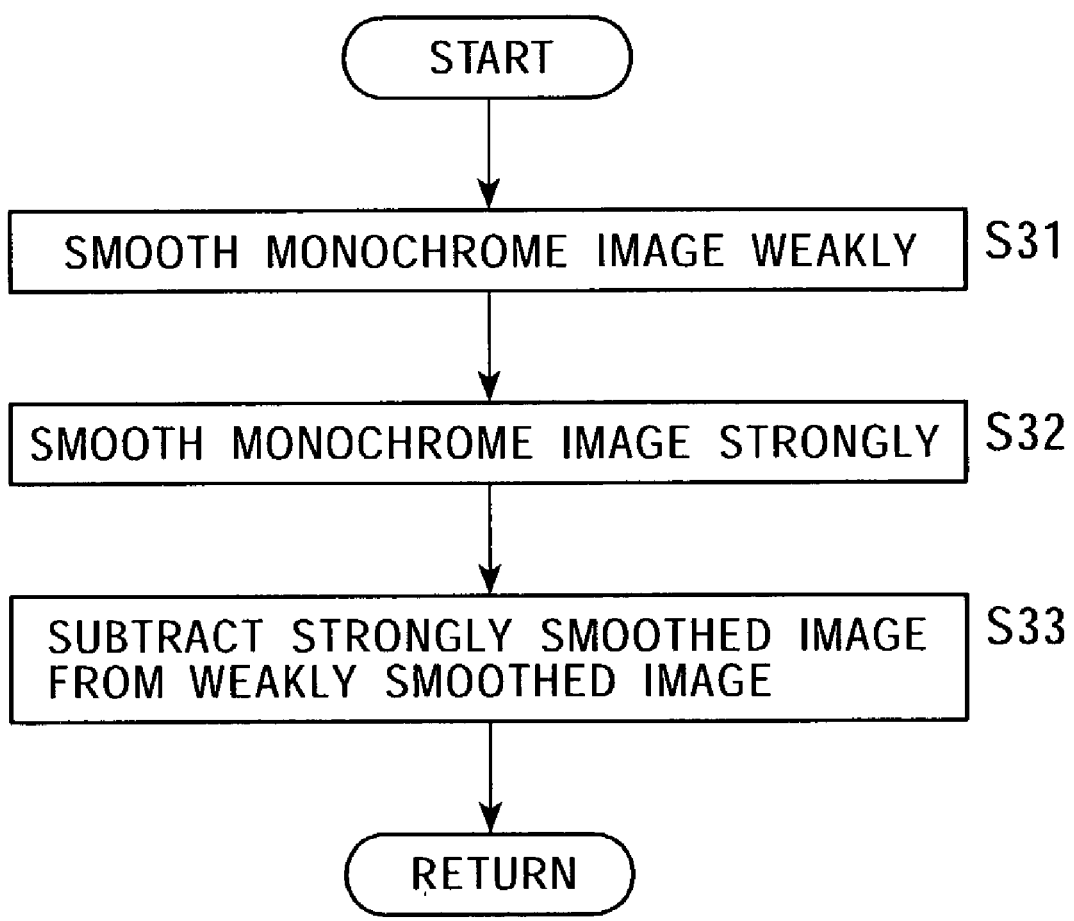
FIG. 3 is a flowchart showing the details of step S3 in FIG. 2.

Next, the image data thus converted into monochrome is processed (vein enhancement process) to enhance the vein pattern (step S3). A detailed flowchart of the vein enhancement process is shown in FIG. 3. First, in this process, the CPU 12 weakly smoothes the monochrome image output by the image processing section 11 (step S31). Weak smoothing herein means getting the average of the data for each pixel composing the image within a region having a diameter, for example, corresponding to the length of 3 to 15 pixels.

Specifically, in order to smooth pixels in the vicinity of a coordinate point $(x_1, y_1)$, first, pixels included in a circle around the coordinates within a radius corresponding to N pixels are extracted.

Assuming the radius of a single pixel is '1' herein, the condition for an arbitrary coordinate point (x, y) which is to be in a circle with a radius corresponding to N pixels (radius N) from the coordinate point $(x_1, y_1)$ is to satisfy the following expression.

$$(x-x_1)^2+(y-y_1)^2-N^2 \leq 0 \quad (1)$$

Also, since coordinates (x, y) that satisfy expression (1) are all within the region of ±N from the coordinates $(x_1, y_1)$, the conditions $$\begin{cases} x_i - N \leq x \leq x_i + N \\ y_i - N \leq y \leq y_i + N \end{cases} \quad (2)$$

are satisfied.

Therefore, by obtaining coordinates (x, y) satisfying expression (1) within a region where expressions (2) are satisfied and getting the weighted average of the luminance data of pixels located at each of the obtained coordinate points (x, y), it is possible to smooth the luminance data for pixels around the coordinate point $(x_1, y_1)$ in a region located within a radius corresponding to N pixels from the pixel at the coordinate point $(x_1, y_1)$.

Figure 4:
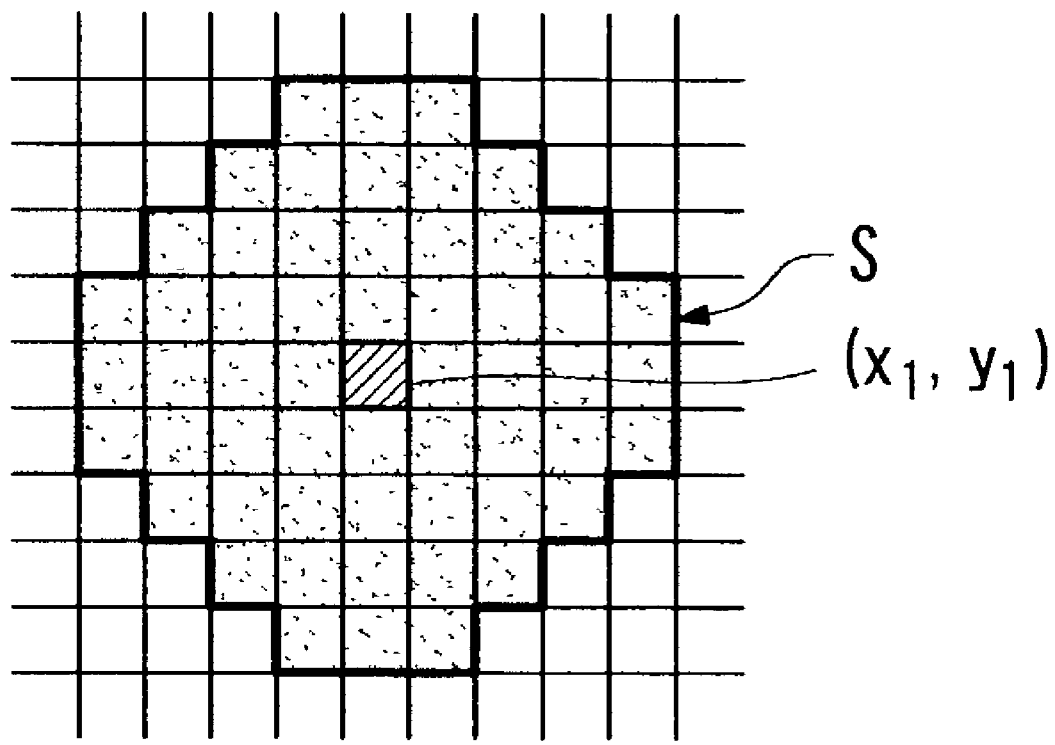
FIG. 4 is a schematic diagram showing a region of pixels used in smoothing an image in the method for personal identification according to the invention.

If, for example, N=4, then pixels within a radius corresponding to 4 pixels from the point $(x_1, y_1)$ become the region S in FIG. 4, wherein this region S is the region where the luminance data around the point $(x_1, y_1)$ is to be smoothed.

This computation is performed, setting N to a value from 1 to 8 (or 2N=3 to 15) and changing the point $(x_1, y_1)$ to cover the whole image. A new image according to the computation results for all points is formed to obtain a weakly smoothed image.

Figure 5A:
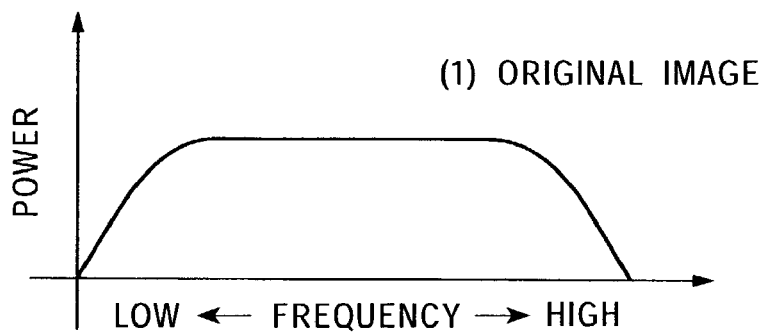
Figure 5B:
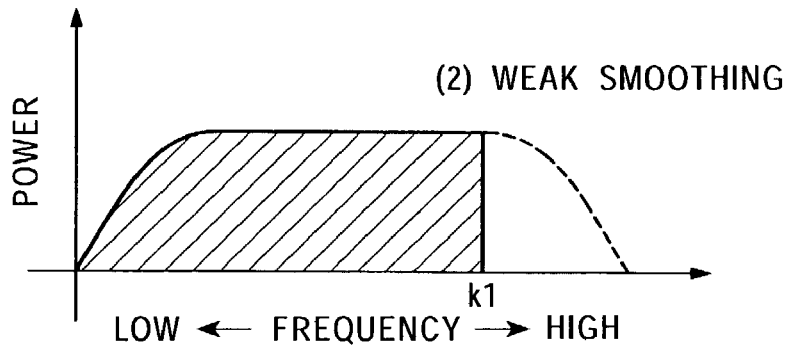

If the spatial frequency spectrum of the luminance of the monochrome image converted from the original image is, for example, as shown in FIG. 5A, this weak smoothing process is equivalent to removing frequency components higher than a spatial frequency of k1 corresponding to a diameter (a first scale) of 3 to 15 pixels, as shown in FIG. 5B.

Next, the monochrome image is strongly smoothed (step S32). Strong smoothing herein means getting the average of the luminance data of each of the pixels composing the image within a region, for example, having a diameter corresponding to 21 to 61 pixels. Specifically, in the strong smoothing processing, coordinates (x, y) that satisfy expression (1) are obtained within the region given by expression (2) described above with N=10 to 31 to get a weighted average of data of pixels located at each of the obtained coordinate points (x, y). Thus, it is possible to smooth the luminance data of pixels around the coordinate point $(x_1, y_1)$ in a region located within a radius corresponding to 10 to 31 pixels (a diameter corresponding to 21 to 61 pixels) from this pixel.

This computation is performed while changing $(x_1, y_1)$ to cover the whole image. A new image according to the computation results for all points is formed to obtain a strong smoothed image.

Figure 5C:
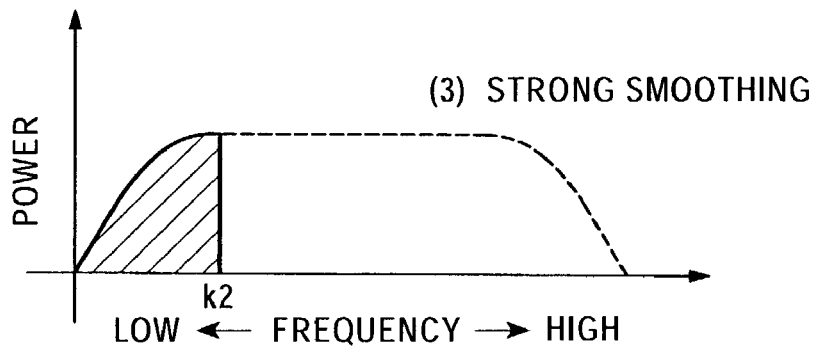

If the spatial frequency spectrum of the luminance of the monochrome image converted from the original image is, for example, as shown in FIG. 5A, this strong smoothing process is equivalent to removing frequency components higher than a spatial frequency of k2 corresponding to a diameter (a second scale) of 21 to 61 pixels, as shown in FIG. 5C.

Figure 5D:
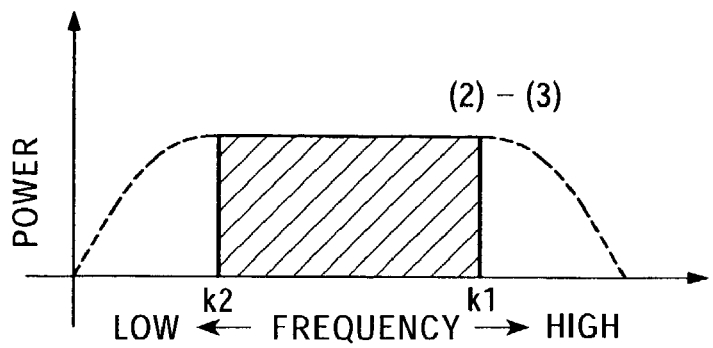
Figure 6:
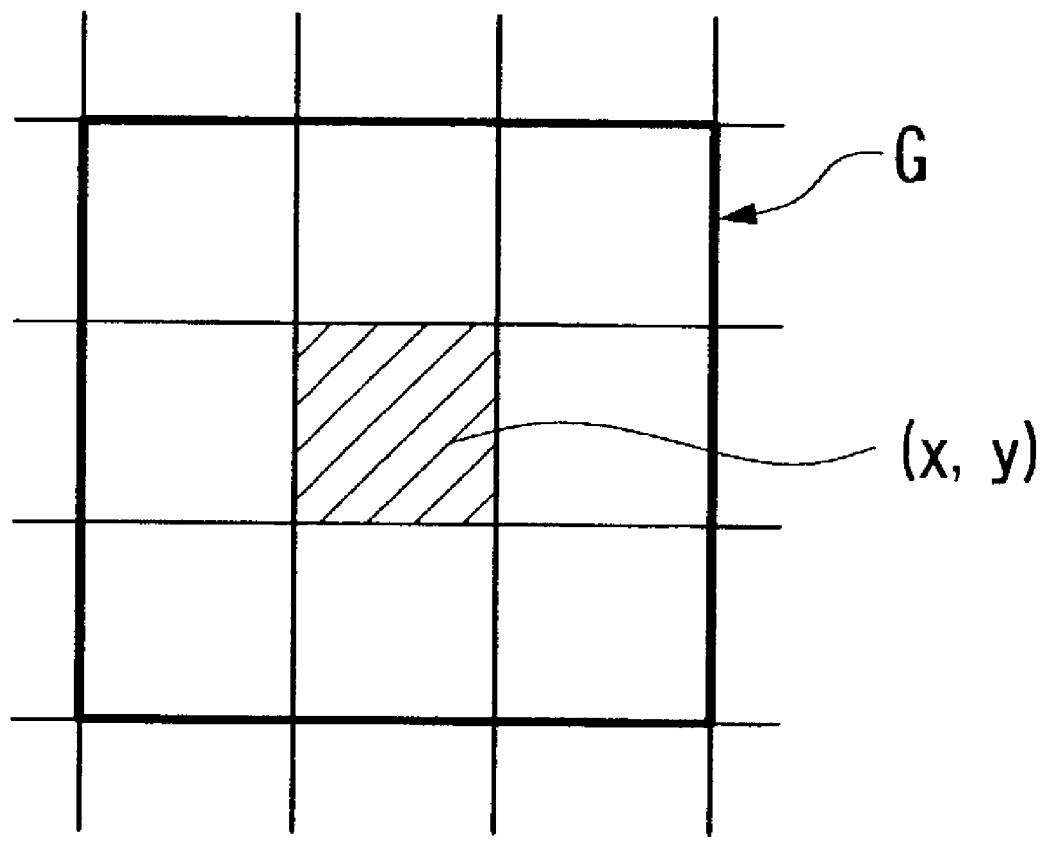
FIG. 6 is a schematic diagram showing the region in which the pixels of an identification image lie, data of which pixels are to be compared with those of predetermined pixels of a registered image to get the differences between the corresponding pixels, according to the invention.

Next, the luminance data of each point of the strongly smoothed image obtained in step S32 is subtracted (step S33) from the luminance data of the corresponding points of the weakly smoothed image obtained in step S31 to form a new image with the veins enhanced. As shown in FIG. 5D, this is equivalent to extracting from the spatial frequency spectrum of the luminance of the monochrome image converted from the original image only the components corresponding to the spatial frequencies between the spatial frequency k1 corresponding to a diameter of 21 to 61 pixels and the spatial frequency k2 corresponding to a diameter of 3 to 15 pixels. This means that the processing of the original image in steps S31 through S33 is equivalent to passing the original image through a bandpass filter that removes predetermined high frequency components and low frequency components. Herein, removing the high frequency components and the low frequency components means extracting only spatial frequencies corresponding to the length scale of the vein pattern of a human body from the image data, and thus the image obtained by this process can be used as an image with an enhanced vein pattern (a vein-enhanced image or an identification image).

Next, the luminances of the image obtained in step S33 are normalized (step S4). In other words, since the contrast of the image has been reduced through the process performed in steps S31 through S33, the luminances of the vein enhanced image are adjusted so that the difference between the maximum luminance and the minimum luminance increases. Further, if a luminance value becomes negative as a result of the subtraction in step S33, an offset value is added to each luminance data at respective coordinate points of the image to make it a positive number.

Specifically, if the number of luminance tones is 256 (0 to 255), a vein-enhanced image is converted, for example, such that the minimum luminance becomes 50 and the maximum luminance becomes 200, thus increasing the difference therebetween. If the vein-enhancement image herein has a luminance distribution of 100 to 150, the luminance of each pixel can be normalized according to a formula $$\alpha=3\times\beta-250$$

where α and β denote the luminance after conversion and the luminance before conversion, respectively.

Thus, the luminance range of a vein-enhanced image can be adjusted to a predetermined range (for example, 50 to 200), and, also, the luminance range of a registered image can previously be set in a predetermined range so that image comparison can be correctly carried out in step S5, which will be described later.

In the example described here, the luminances are linearly adjusted, though they may be adjusted nonlinearly instead.

Further, the CPU 12 compares a registered image previously stored in the storage unit 13 and the image data with luminances normalized in step S4 to perform identification processing (step S5). As a registered image of an individual, an image previously formed by processing, in such steps as S1 through S4, an original image of a wrist of an individual who is to be identified is used and is stored in the storage unit 13. This registered image of the individual is stored in the storage unit 13 so as to be associated with the individual's name or the like, and it may previously be set such that it can be called up by searching for the individual's name when performing identification processing on a certain person. Or, if the number of individuals to be identified is relatively limited, then image data of an individual to be identified formed by the process in steps S1 through S4 may be compared with all registered images of individuals.

A specific comparison of image data is as follows.

Representing a registered image stored in the storage unit 13 by A and an image to be identified by B, identification can be made by confirming that image A and image B are identical in respective data when image B is moved by a predetermined coordinate value. However, due to variations, for example, on how the hand is positioned, image A and image B are seldom completely identical. In practice, it may be determined whether there exists a shift x and a shift y through shifting the image B by shift x horizontally and shift y vertically; that makes the sum of the luminance differences between image B and image A at respective pixels less than a predetermined threshold.

Representing luminance data of image A and image B at a coordinate point (x, y) by A(x, y) and B(x, Y), respectively, the original luminance difference d at each coordinate point (x, y) between an image A and an image B, image B being shifted by a certain value (shift x, shift y), is given by:

$$d = A(x,y) - B(x + \text{shift } x, y + \text{shift } y) \qquad (3)$$

However, taking into account some geometric deformation or rotational deviation between image A and image B to be compared, and according to luminance differences between image A and image B shifted a certain amount, the degree of similarity diff between image A and image B is defined by:

$$\text{diff}(\text{shift} x, \text{shift} y) = \frac{\sum_{x,y} \min(A(x, y) - B(x + \text{shift} x + x1, y + \text{shift} y + y1))^2}{\text{number of compared pixels}} \qquad (4)$$

where the function represented by min( ) represents the minimum value when varying x1 and y1 within the range of −1 to 1. Herein, x1 and y1 are both integers with $(x_1, y_1)$ changing to 9 pairs, namely, (−1, −1), (−1, 0), (−1, 1), (0, −1), (0, 0), (0, 1), (1, −1), (1, 0), and (1, 1). Among these 9 pairs of x1 and y1, the pair of x1 and y1 that minimizes the value in the parentheses of the min( ) function is adopted for calculation. It is assumed herein that the vertical and horizontal dimensions of a pixel are both '1'.

Thus, according to expression (4), as the luminance data to be subtracted from the luminance data A(x, y) of image A, the luminance data with a minimum difference from A(x, y) out of the luminance data of 9 pixels in total is used; that is to say the pixel at (x, y) and the other pixels therearound in image B.

In other words, for a certain pixel (x, y) of image A, and from a group G of pixels of image B located within a predetermined region (x±1, y±1) from this certain pixel (x, y), the pixel with a minimum data difference from that of the certain pixel (x, y) of image A is adopted as a corresponding pixel. Then, according to the sum of the data differences between corresponding pixels of image A and image B adopted as such, the degree of similarity of image A and image B is computed.

Further, with regard to the degree of similarity diff(shift x, shift y) represented by expression (4), the values of shift x and shift y are changed so that the CPU 12 searches for shift x and shift y, in a predetermined range (for example, −10 to +10 (integer)), that satisfy:

$$\text{diff}(\text{shift } x, \text{shift } y) \leq TH \qquad (5)$$

where TH is a predetermined threshold (for example, 90 (integer)). Then, the CPU 12 permits identification by the existence of shift x and shift y that satisfy expression (5) and indicates the result on the display section 14. Herein, the CPU 12 does not continue to compute the degree of similarity diff by continuing to change the values of shift x and shift y; rather, it stops the computation.

This means that the relative position between image A and image B is changed for shift x and shift y within a predetermined range to obtain the degrees of similarity diff for each of the plurality of relative positions, and computation of the degrees of similarity is terminated when a degree of similarity diff at a certain relative position has a value below the threshold TH.

On the other hand, even when changing shift x and shift y within a predetermined range, if there exist no shift x and shift y that satisfy expression (5), the CPU rejects the identification and indicates the result on the display section 14.

As described above, in the present embodiment, a degree of similarity diff is computed according to data differences between an image of a vein pattern, the image being picked up by the image pickup section 5, and a registered image of a vein pattern of a certain person stored in the storage unit 13, in order to carry out identification according to the relationship between the degree of similarity and a predetermined threshold TH.

Thus, in the present embodiment, images of a vein pattern with a coarse resolution are compared to each other so that image comparison does not require a heavy processing load, and, further, identification is carried out by comparing the degree of similarity diff and the threshold TH. Therefore, processing, such as character extraction in pattern recognition, is not needed. Consequently, an accurate identification process is realized by a simple process.

Further, in the present embodiment, if the relative position (shift x, shift y) between a sampled image of a vein pattern and a registered image is changed within a predetermined range, degrees of similarity diff are obtained for the plurality of relative positions (shift x, shift y), respectively, thereby enabling the registered image to be handled even when there is a deviation in position from the picked-up image of the blood vessel pattern. Still further, when the degree of similarity diff at a relative position (shift x, shift y) shows a value below a threshold TH, computation of degrees of similarity is terminated, which allows the computational load to be reduced.

Yet further, in the present embodiment, processing of a sampled image of a vein pattern is performed to extract spatial frequency components within a predetermined range (that is to effectively make the image pass through a bandpass filter), and thus an image with spatial frequency components corresponding to the scale of the vein pattern can be obtained, which makes it possible to enhance the vein pattern easily. This bandpass filter can easily be implemented by subtracting tone data of an image of a blood vessel pattern smoothed at a second scale from tone data of an image of a blood vessel pattern smoothed at a first scale, wherein the second scale is greater than the first scale. Data indicating luminance or color tone can be employed as tone data herein.

In addition, luminances of a registered image and an identification image are normalized so that they are adjusted to be within a predetermined range, which allows correct determination of the degrees of similarity so as to ensure high identification accuracy.

In the present embodiment, in the determination of the degree of similarity of a registered image (image A) and an identification image (image B) from pixels of image B within a predetermined region corresponding to the position of a certain pixel of image A, a pixel having data with a minimum difference from that of the certain pixel of image A is selected as the pixel corresponding to the certain pixel of image A. Therefore, even with some deformation or rotational deviation of an image due to sampling of the identification image data, the deformation and deviation can be corrected locally.

Further in the present embodiment, since the recessed section 4 is formed on the top surface 3a of the arm section 3 and also the image pickup section 5 is located on a bottom surface of the recessed section 4, the wrist and the data detection surface are separated from each other, which prevents the wrist from being pressed against the data detection surface to keep an image thereof from enlarging.

In the embodiment described above, other configurations may be employed without departing from the spirit and scope of the present invention.

For example, in the embodiment in the foregoing description, if a rotational deviation of image B with respect to image A is not negligible, the degree of similarity of image A and image B with a certain deviation is given by the following expression:

$$\text{diff}(\text{shift}x, \text{shift}y, \text{shift}\theta) = \frac{\sum_{x,y} \min(A(x, y) - (B(X + \text{shift}x + x1, Y + \text{shift}y + x1))^2}{\text{number of compared pixels}} \quad (6)$$

where:

$$\begin{cases} X = x \times \cos(\theta + \text{shift}\theta) - y \times \sin(\theta + \text{shift}\theta) \\ Y = x \times \sin(\theta + \text{shift}\theta) + y \times \cos(\theta + \text{shift}\theta) \end{cases} \quad (7)$$

By changing the values of shift x, shift y, and shift θ in a predetermined range (shift x and shift y are, for example, −10 to +10 (integer), and shift θ is, for example, −15 to +15 (integer)), shift x, shift y, and shift θ that satisfy the following expression are searched for:

$$\text{diff}(\text{shift } x, \text{shift } y, \text{shift } \theta) \leq TH \quad (8)$$

The CPU 12 allows identification when shift x, shift y, and shift θ satisfy expression (8) and displays the result on the display section 14.

When changing shift x, shift y, and shift θ within a predetermined range, if no shift x, shift y, and shift θ that satisfy expression (8) exist, then the CPU 12 indicates that identification is unsuccessful.

Adoption of such a method for identification makes it possible to correct a deviation, if any, of the angle of an arm positioned on the arm section 3 from a previous angle of the arm when the registered image (image A) was sampled.

The configuration of an apparatus for data sampling is not limited to one in the shape of a chair, as shown in FIG. 1; it may have the shape only of a table on which the arm is positioned or another shape.

Although in the above described embodiment, an image of a vein pattern of a wrist is to be picked up, the images to be processed are not limited to this; it also is possible to pick up an image of an artery pattern, a blood vessel pattern of another part of the human body, or, indeed, any other physical characteristic.

Further, programs such as those described in the above embodiment may be in a form recorded on the following storage media.

Regarding storage media, the program described above to be executed by the CPU 12 may be stored in a storage medium readable by a computer system, such as a CD-ROM, a DVD, a memory, a hard disk, or the like.

In addition to the above, the configuration according to the embodiment described above may be employed, or it may be changed to another configuration without departing from the spirit and scope of the present invention.

The invention claimed is:

1. An apparatus for personal identification comprising:
    a storage unit for storing an image of a wrist blood vessel pattern of a certain person as a registered image;
    an image pickup section for picking up an image of a wrist blood vessel pattern of a human body;
    an identification section for computing a degree of similarity according to a data difference between the image of the wrist blood vessel pattern picked up by the image pickup section and the registered image to carry out identification according to the relationship between the degree of similarity and a predetermined threshold;
    a positioning section enabling positioning of a wrist thereon; and
    a recessed section formed in a recessed shape on a top surface of the positioning section, wherein the image pickup section is located on a bottom surface of the recessed section, such that the wrist blood vessel pattern is not distorted at the location of the image pickup station when the wrist is positioned in contact with the positioning section.

2. An apparatus for personal identification according to claim 1, wherein the relative position between the image of the wrist blood vessel pattern and the registered image is changed within a predetermined range to obtain degrees of similarity for a plurality of the relative positions respectively, and wherein the identification section carries out identification by comparing each of the degrees of similarity computed for the plurality of the relative positions and the predetermined threshold.

3. An apparatus for personal identification according to claim 2, wherein when the identification is successful with the degree of similarity computed for one of the plurality of the relative positions, computation of the degree of similarity by the identification section is stopped.

4. A method for personal identification comprising the steps of:
    storing, in advance, as a registered image, an image formed by extracting spatial frequency components within a predetermined range from an image of a wrist blood vessel pattern of a certain person;
    picking up an image of a wrist blood vessel pattern of a person to be identified; and
    forming an identification image by extracting spatial frequency components within the predetermined range from the picked up image of the wrist blood vessel pattern to determine whether the person to be identified and the certain person are the same, according to a degree of similarity between the identification image and the registered image;
    wherein picking up the image of the wrist blood vessel pattern is performed by prompting the positioning of a wrist in contact with a positioning section having a recessed section formed in a recessed shape on a top surface of the positioning section, wherein the image pickup section is located on a bottom surface of the recessed section, such that the wrist blood vessel pattern is not distorted at the location of the image pickup station when the wrist is in contact with the positioning section.

5. A method for personal identification according to claim 4, wherein the extraction of spatial frequency components within the predetermined range is carried out by subtracting tone data of an image of the wrist blood vessel pattern smoothed at a second scale from tone data of an image of the wrist blood vessel pattern smoothed at a first scale, the second scale being larger than the first scale.

6. A method for personal identification according to claim 4, wherein luminances of the registered image and the identification image are adjusted to be within a predetermined range.

7. A computer program product, for personal identification, the computer program product stored on a computer readable medium and adapted to perform operations comprising:
   storing, in advance, as a registered image, an image formed by extracting spatial frequency components within a predetermined range from an image of a wrist blood vessel pattern of a certain person;
   picking up an image of a wrist blood vessel pattern of a person to be identified; and
   forming an identification image by extracting spatial frequency components within the predetermined range from the picked up image of the wrist blood vessel pattern to determine whether the person to be identified and the certain person are the same, according to a degree of similarity between the identification image and the registered image;
   wherein picking up the image of the wrist blood vessel pattern is performed by prompting the positioning of a wrist in contact with a positioning section having a recessed section formed in a recessed shape on a top surface of the positioning section, wherein the image pickup section is located on a bottom surface of the recessed section, such that the wrist blood vessel pattern is not distorted at the location of the image pickup station when the wrist is in contact with the positioning section.

8. The computer program product of claim 7, wherein the extraction of spatial frequency components within the predetermined range is carried out by subtracting tone data of an image of the wrist blood vessel pattern smoothed at a second scale from tone data of an image of the wrist blood vessel pattern smoothed at a first scale, the second scale being larger than the first scale.

9. The computer program product of claim 7, wherein luminances of the registered image and the identification image are adjusted to be within a predetermined range.

10. The apparatus of claim 1, wherein the positioning section and recessed section are provided in a chair armrest.

11. The method of claim 4, wherein the positioning section and recessed section are provided in a chair armrest.

12. The computer program product of claim 7, wherein the positioning section and recessed section are provided in a chair armrest.

\* \* \* \* \*